United States Patent [19]

Butler et al.

[11] 3,886,420

[45] May 27, 1975

[54] FREQUENCY RESPONSIVE SPEED CONTROL APPARATUS

[75] Inventors: William K. Butler; J. Donald Hughson, both of Rochester, N.Y.

[73] Assignee: General Signal Corporation, Rochester, N.Y.

[22] Filed: Sept. 10, 1973

[21] Appl. No.: 395,674

[52] U.S. Cl. .............. 318/327; 318/345; 246/182 C

[51] Int. Cl. .............. H02p 5/00

[58] Field of Search .............. 318/326–328, 318/345; 246/182 C

[56] References Cited

UNITED STATES PATENTS

| | | | |
|---|---|---|---|
| 3,233,163 | 2/1966 | Mishima | 318/327 |
| 3,488,571 | 1/1970 | Tamaki | 318/328 |
| 3,748,466 | 6/1974 | Sibley et al. | 246/63 C |
| 3,825,744 | 7/1974 | Sibley et al. | 246/182 C |

*Primary Examiner*—G. R. Simmons
*Assistant Examiner*—John J. Feldhaus
*Attorney, Agent, or Firm*—Pollock, Philpitt & Vande Sande

[57] ABSTRACT

A speed control apparatus for sensing over speed conditions of a vehicle. A signal source which produces signals at a frequency which is proportional to vehicle speed feeds an electronic high pass filter whose cut-off frequency is variable and settable to a frequency which is proportional to the predetermined speed above which an over speed condition exists. A relay driver is operated in response to signals passed by the electronic high pass filter to operate a relay. In order to check the cut-off frequency of the high pass filter, a check oscillator is provided which is tuned to a frequency slightly in excess of the desired cut-off frequency of the high pass filter. The relay driver operates an electronic switch which intermittently provides the signals from the check oscillator to the electronic high pass filter. In operation, when the vehicle is under speed, the speed signals will not pass the electronic high pass filter and thus the relay driver is operated to one condition which enables the electronic switch to pass the check oscillator signals to the high pass filter. These signals, being at a frequency slightly in excess of the cut off frequency of the high pass filter, will pass through the filter and operate the relay driver to a second condition. Intermittent operation of the relay driver maintains the relay energized. This will cause the switch to open and the only signals passing to the high pass filter will be those generated by the signal source. The check oscillator provides for dynamic testing of the system and also provides a check on the cut-off frequency of the high pass filter. If that cut-off frequency rises, the check oscillator signal will not pass the high pass filter and thus the relay driver will not operate intermittently and this will cause the relay to drop away.

In order to ensure a stable frequency from the check oscillator, it is operated continuously and a switch is provided to pass the check oscillator signals intermittently to the high pass filter. Furthermore, the check oscillator signals are introduced in such a manner that during those periods during which the check oscillator signals are fed to the electronic high pass filter, the signals from the signal source are ineffective.

12 Claims, 2 Drawing Figures

FREQUENCY RESPONSIVE SPEED CONTROL APPARATUS

FIELD OF THE INVENTION

This invention relates to frequency responsive speed control apparatus and more particularly to an improved frequency responsive speed control apparatus which provides both dynamic and static checking of the circuity.

BACKGROUND

In automatic speed control apparatus, it has been customary to employ frequency responsive devices to indicate vehicle speeds in excess of desired safe speeds as determined by associated control eqiupment. Generally the output of a frequency generator responsive to the speed of the vheicle is measured and an indication of over speed with a resultant brake application is given whenever the frequency of the speed signal exceeds a predetermined value relative to the desired or safe speed limit.

Practical systems utilized for this purpose impose a variable speed limit on the train; imposition of varying speeds being required for maximum utilization of train capacity while still providing safety limits. The signal output of an axle-driven generator is applied to a filter which produces an output whenever the frequency exceeds a value commensurate with the desired speed.

Since speed control apparatus is intrinsically involved in the safety of the vehicle, it is necessary that the integrity of the apparatus be continuously checked. Checking is accomplished by introducing into the system a check signal with frequency in excess of the frequency corresponding to the desired speed limit. This check signal, in addition to the axle-generator signal, is imposed upon the filter; since it is greater than the desired or predetermined frequency it produces an output from the filter which output indicates integrity of the circuitry. A check oscillator produces the check signals and a switching network intermittently inhibits the oscillators signals from reaching the filter and thus a continuously alternating checking operation is established, i.e., the check frequency oscillator signal is detected by the filter which produces an output signal which inhibits the checking oscillator signal from reaching the filter. Obviously this intermittent operation will continue as long as the integrity of the system remains intact. To further add to the fail-safe qualitites of such systems, a relay is energized to indicate that the train is proceeding. If at any time intermittent operation of the check signal fails, which may result from absence of the oscillator frequency, presence of an axle generator signal in excess of the frequency related to the desired speed limit, or circuit malfunction, the under speed relay indicator is deenergized and imposes upon the train an over speed condition resulting in the application of safety measures.

The prior art discloses a frequency responsive system, which competently and with a high dgree of reliability indicates any excursion of the vehicle into an over speed condition. It further provides a degree of safety by check dynamic characteristics of the circuit. There are, however, problems not obviated by the prior art which affect the safety of the vehicle by introducing instances where an over speed condition may be attained without giving such an indication to the vehicle controls.

A circumstance in which this probability exists concerns the frequency characteristics of the filter. Filter operation is based upon the state of charge of a capacitor. The capacitor is charged at a rate determined by the pulse fed to the filter. These pulses are produced by a monostable multivibrator which produces pulses of a constant amplitude and width whose repetition rate is dependent upon the frequency of the signals fed to the filter. Between pulses the capacitor is discharged through a resistor which is chosen in accordance with a predetermined speed limit. If pulses occur at a repetition rate high enough, in relation to the resistor value chosen relative to the predetermined speed limit, a unijunction transistor will fire producing an output signal indicating that the repetition rate of the signals fed to the filter was above the predetermined frequency related to the speed limit. It is apparent that there are a number of factors which can affect the performance of this filter, such as changes in contact resistance, a variation in the pulse width of the pulses provided to the capacitor, etc. It is possible that variations of these parameters will in effect raise the cut-off frequency of the filter. This will have the effect of allowing an overspeed condition without the apparatus responding thereto. Therefore, applications provide a check oscillator, whose frequency is slightly above the cut-off frequency of the filter for the predetermined speed limit. Since the system requires the check oscillator frequency to pass the filter, if the filter cut-off frequency rises to a sufficient extent as to block passage of the check oscillator signals, then a malfunction will be detected.

In injecting this check oscillator signal into the circuitry, it will be observed that mixing of the check oscillator signal with the speed signals from the axle generator must be avoided. Such mixing will result in a mixed signal with frequency which is higher than the check oscillator frequency. As a result, notwithstanding potential undesirable rise in cut-off frequency of the filter, this spurious signal caused by mixing of the check oscillator signal and the speed signal, will still pass the filter. Applicants have provided apparatus for injecting the check oscillator signal in such a manner that it does not mix with the speed signal and thus provides a reliable static test of the cut-off frequency of the high speed filter which is essential to safe vehicle operation.

Since the check oscillator frequency is the standard against which the cut-off frequency of the filter is determined, every effort must be made to ensure that this oscillator is stable. Therefore, the oscillator itself is free running and its output is fed to a solid state switching circuit which recurrently allows the oscillator signal to pass.

BRIEF DESCRIPTION OF THE DRAWINGS

The drawings are intended to be exemplary and to aid in the understanding of the invention. In the drawings, like reference characters identify identical apparatus.

DETAILED DESCRIPTION OF THE DRAWINGS

Figure 1:
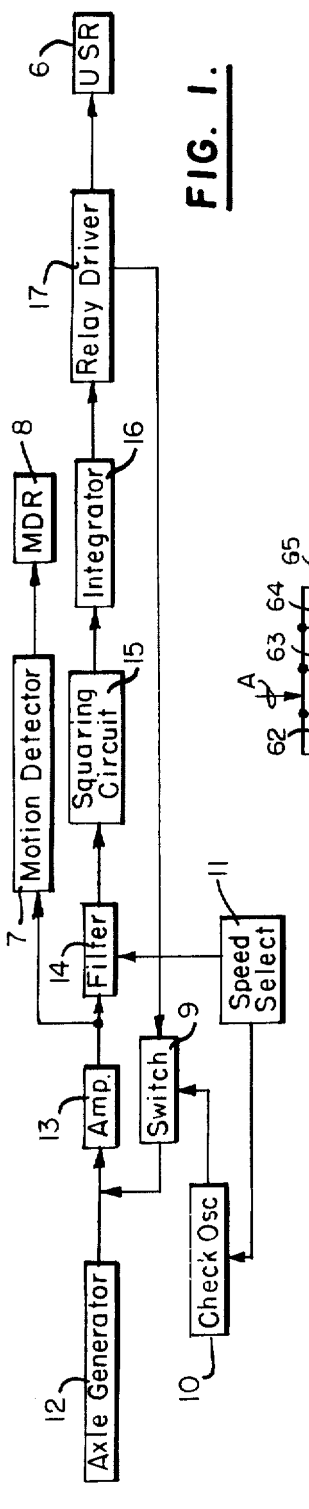
FIG. 1 is a block diagram of the frequency responsive speed control apparatus as applied to a train.

FIG. 1 is a block diagram of a preferred embodiment of the invention as applied to a frequency responsive train speed control apparatus. Included within the apparatus shown in FIG. 1 are three subsystems, the first being the train speed monitoring apparatus per se which includes axle generator 12, amplifier 13, filter 14, squaring circuit 15, integrator 16, relay driver 17, and underspeed relay 6.

The axle generator 12, shown schematicaly in FIG. 1, may consist of any practical arrangement wherein an output signal with frequency proportional to train speed is achieved. One well known apparatus of this type comprises a multi-tooth wheel rotating in a magnetic circuit, coupled to the train axle drive to produce an output signal frequency proportional to speed. Alternatively, a magnetic member may be driven by the train axle causing a voltage to be induced in a field effect device or any other device sensitive to train speed capable of producing a proportional frequency output. The particular type of construction of axle generator 12 is not significant to this invention so long as its output frequency is proportional to train speed. Amplifier 13 will be discussed in more detail with respect to FIG. 2, suffice it to say here, that it merely amplifies the signals fed to it. Filter 14 is an electronic high pass filter with a variable cut-off frequency. The cut-off frequency of this filter is chosen to be proportional to the desired speed limit. That is, as the desired speed limit decreases, the cut-off frequency of this filter likewise decreases. The cut-off frequency is so chosen that as long as the train is traveling at a speed lower than the selected speed limit, the signals from axle generator 12 will not pass filter 14. Squaring circuit 15 squares up any signals passed by filter 14 and provides them to integrator 16. Integrator 16 merely requires a predetermined number of pulses fed to it from squaring circuuit 15 before it wil energize relay driver 17. In a preferred embodiment two pulses from squaring circuit 15 are required before integrator 16 produces an output. Relay driver 17, in response to signals fed to it from integrator 16, energizes underspeed relay 6. Relay driver 17 requires intermittent signals in order to maintain the underspeed relay 6 energized. A steady input to relay driver 17 will cause underspeed relay 6 to be deenergized indicating an overspeed condition requiring action of other control circuits.

A second subsystem includes the axle generator 12, amplifier 13, motion detector 7, and motion detector relay 8. When the train is in motion the pulse output of amplifier 13 is fed to motion detector 7 which maintains the motion detector relay 8 energized. When the train is in motion, motion detector relay 8 should be deenergized. This serves as a check upon the axle generator 12 to ensure that it is operating properly.

The third subsystem operates to check both statically and dynamically the first subsystem or actual speed monitoring apparatus. In addition to the first subsystem, this includes a check oscillator 10, the frequency of which is determined by the speed selecting circuit 11. A switch 9 is at times enabled to feed the output of check oscillator 10 to the amplifier 13. The condition of switch 9 is dependent upon relay driver 17.

Figure 2:
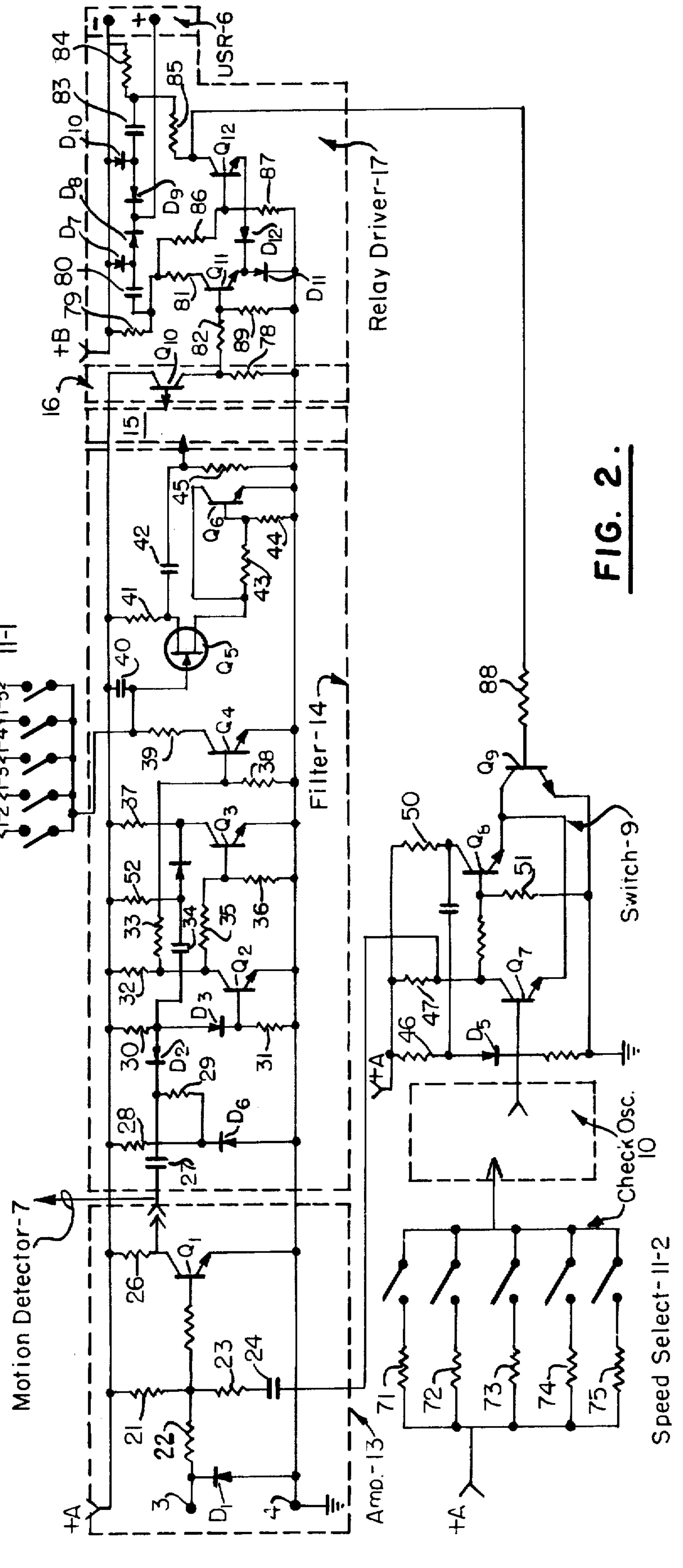
FIG. 2 is a cricuit schematic of a portion of the apparatus shown in FIG. 1.

The speed select device 11 controls the cut-off frequency of filter 14 and the frequency of check oscillator 10. This speed select circuit 11 can be controlled from the wayside as described in prior U.S. Pat. No. 3,482,090, the description of which is incorporated herein by reference. In normal practice, a wayside control unit provides control signals which are transmitted from the wayside in the track rails. These signals are usually picked up by train pick-up coils but depending on the situation such controls may also be transmitted alternatively by radio communications or even be contained within storage equipment located on the train itself. As shown in more detail in FIG. 2, the speed select unit comprises a pair of resistor matrices, one for the electronic filter 14 and another one for check oscillator 10. Although FIG. 2 shows these as resistor matrices, other step impedance devices or even continously variable impedance devices may be used to mainfest the desired speed limit and properly control electronic filter 14 and check oscillator 10. Since one of the functions of the third or checking subsystem is to statically check the cut-off frequency of filter 14, there is a predetermined relationship between the cut-off frequency of filter 14 and the frequency of check oscillator 10. In particular, for any desired speed limit, the frequency of check oscillator 10 is chosen to be slightly higher than the cut-off frequency of filter 14. In a preferred embodiment for each of the desired speed limits, the frequency of check oscillator 10 is chosen as 2% above the cut-off frequency of filter 14.

In normal operation, assuming the train is below the speed limit set by speed select circuit 11, the system shown in FIG. 1 will operate as follows.

The axle generator 12 produces signals at a frequency proportional to vehicle speed, these signals are amplified by amplifier 13. Since we have assumed that the speed of the train is below the speed limit selected by speed select circuit 11, the speed signals (hereinafter we will refer to the axle generator output as a speed signal) will not pass filter 14 since they are below its cut-off frequency. The lack of signal passing filter 14 results in relay driver 17 receiving no signal which enables switch 9. The speed select circuit 11, as has been discussed above, controls check oscillator 10 to oscillate at a frequency which is slightly greater than the cut-off frequency speed select circuit 11 selects for filter 14. When switch 9 is enabled to pass check oscillator signals to amplifier 13, these signals will mask the speed signals also fed to the amplifier 13. One of the prime requisites of this arrangement is that the speed signals and the check oscillator signals do not mix. As a result, amplifier 13 amplifies the check oscillator signals which are fed to filter 14. Assuming that the filter 14 is operating properly, these signals will pass the filter and eventually energize relay driver 17. This will disable switch 9 from passing further check oscillator signals. The intermittent energization and deenergization of relay driver 17 results in the energization of underspeed relay 6. A failure in the energization of underspeed relay 6. A failure in the speed sensing circuit will obviously result in deenergization of underspeed relay 6. However, underspeed relay 6 can also be deenergized if the cut-off frequency of filter 14 rises above the frequency of check oscillator 10. If this occurs, the check oscillator signals will also not pass filter 14. As a result, relay driver 17 will not be intermittently energized and this will cause underspeed relay 6 to be deenergized. Thus, the apparatus shown in FIG. 1 compares the cut-off frequency of filter 14 with the frequency of check oscillator 10. If the cut-off frequency of filter 14 rises above the frequency of check oscillator 10, the system recognizes a dangerous condition which requires protective reaction by the other control circuitry on the train and this is signalled by deenergization of underspeed relay 6.

In order to understand more fully applicants' invention, reference is now made to FIG. 2 which shows the schematically some of the apparatus shown in block diagram in FIG. 1.

In FIG. 2 speed select circuit 11 is shown as speed select circuit 11-1 which is associated with the electronic filter 14, and a speed select circuit 11-2 which is associated with check oscillator 10. In these speed select circuits, a plurality of switches 1-1 through 1-5 and 2-1 through 2-5 are shown for selectively connecting one of resistors 61 through 65 to filter 14 and one of resistors 71 through 75 to check oscillator 10. Although only one out of five selections is shown, it will be apparent to those skilled in the art that the number of speed limits can be varied at will, by merely increasing or decreasing the number of resistors and switches employed. The predetermined relationship between the cut-off frequency of filter 14 and the frequency of oscillator 10 is provided by properly choosing the relationship between resistors 61 and 71, 62 and 72, etc. For instance, when one desired speed limit is selected, switches 1-1 and 2-1 are closed connecting resistors 61 and 71 respectively to filter 14 and oscillator 10. The particular device which selects the switches to be closed is of no significance to this invention but relays operated in accordance with the principles of U.S. Pat. No. 3,441,731, the disclosure of which is herein incorporated by reference, can be employed.

The apparatus of FIG. 2 employs two positive sources of potential of differing voltages, preferably the +B source of potential is higher in potential than the +A supply. Terminal 4 is a ground or common terminal. The speed signal from axle generator 12 is provided to terminal 3. Since this is generally a sinusoidal voltage diode D1 is connected so as to clamp terminal 3 to ground. The speed signal is provided to the first stage of amplifier 13, which comprises transistor Q1, through its base resistor 25. Amplifier 13 consists of a number of stages, however, only the first stage transistor Q1 is shown for simplicity. Transistor Q1 is normally biased conductive by resistor 21 tied to the +A supply. However, when the low impedance axle generator 12 voltage goes through zero, transistor Q1 is cut off. An amplified signal of opposite polarity is provided through capacitor 27 to filter unit 14. Thus, the remaining apparatus responds to the zero crossing points of axle generator 12 and in effect counts these to determine the frequency of axle generator 12 and thus the speed of the train.

The input portion of filter 14 comprises a stable mono-stable multivibrator which produces a pulse of predetermined width whose repetition rate is determined by the frequency of signals provided to amplifier 13. The mono-stable multivibrator comprises transistors Q2 and Q3. The input signal from capacitor 27 is fed, through diode D2, and diode D3, to the base of transistor Q2. For each zero crossing at the input to amplifier 13, a positive pulse is produced. Transistor Q2 responds to the negative going edge of the positive pulse. Transistor Q2 is normally conducting and the negative going signal turns transistor Q2 off. This action causes transistor Q3 to conduct for a period determined by the RC time constant of the multivibrator. At the conclusion of this time period, Q2 again conducts and Q3 is turned off. The output of the multivibrator is taken from the collector of Q2 and is provided, through resistor 33, to the base of transistor Q4. The output of the multivibrator is a positive pulse of predetermined duration. In response to this output, transistor Q4 is allowed to conduct for the duration of the output signal.

Transistor Q4 acts as a switch whose action affects the charge on capacitor 40. The period of time during which the switch is closed, i.e., transistor Q4 is conducting, is determined by the RC time constant of the mono-stable multivibrator Q2-Q3. The rate at which the switch is closed is equal to the frequency of the signals which are applied to the amplifier 13. These signals are either speed signals from the axle generator or signals from the check oscillator 10.

One plate of capacitor 40 is connected to a positive source of potential, +A, and the other side of capacitor 40 is connected to the emitter of a complementary unijunction transistor Q5. This other plate of capacitor 40 is also connected to a resistor 39 and, through the speed select network 11-1 to another positive source of potential, +A. The other terminal of resistor 39 is connected to the collector of transistor Q4. Depending upon the speed select network condition, that is, which of the switches 1-1 through 1-5 is closed, one of resistors 61 through 65 will be connected in the circuit to resistor 39. When the transistor Q4 is and has been nonconductive for a sufficient period of time, the other plate of capacitor 40 will be charged to 12 volts. As the switch Q4 is closed at a slow rate, the voltage on the other plate of capacitor 40 will achieve some value below 12 volts and as the rate of switch closures increases, the voltage on the other plate of capacitor 40 will decrease. When it decreases to the point at which complementary unijunction transistor Q5 conducts, and output voltage will be produced and coupled, through capacitor 42, to squaring network 15.

Transistor Q6 and its associated resistors 43 and 44 are provided for temperature compensation purposes.

When complementary unijunction transistor Q5 produces an output signal, it is indicative of the fact that the frequency of input signals to the amplifier 13, from either the check oscillator 10 or the axle generator, is above the cut-off frequency of the filter 14. This indicates, in the case of a speed signal, that the vehicle is proceeding above the predetermined speed limit. The squaring circuit 15 is a mono-stable multivibrator which squares up the signals by filter 14 and provides them to an integrator 16. Integrator 16 requires a plurality of pulses from the squaring circuit 15 within a predetermined period of time before it will produce an output signal. One such integrator is shown, for example, in the Wilcox U.S. Pat. No. 3,482,090.

Assuming that the required pulses are provided to integrator 16 within the necessary time period, then transistor Q10 will conduct providing an input signal to the relay driver 17.

Relay driver 17 is provided with a positive source of potential, +B which is preferably higher than the positive source of potential +A. The relay driver 17 comprises a pair of transistors Q11 and Q12 which control the charging and discharging of a pair of capacitors 80 and 83. When integrator 16 provides a signal to transistor Q11, it conducts allowing capacitor 80 to charge through diode D7. At the conclusion of the signal from integrator 16, transistor Q11 is turned off and transistor Q12 is turned on. Conduction of transistor Q12 allows capacitor 83 to charge through didode D10. At the same time, however, the collector of Q11 rising to approximately the positive source of potential voltage results in capacitor 80 supplying a voltage which is higher than this positive source of potential by an amount equal to the voltage charge collected on capacitor 80. Since the positive source of potential is connected to the negative input of underspeed relay 6, the voltage supplied by capacitor 80 is above the positive source of potential. This is required to maintain the underspeed relay 6 energized. However, it will be apparent that capacitor 80 can supply this voltage only for a predetermined period of time and that after this period of time, underspeed relay 6 will be dropped out unless capacitor 83 is switched in to the circuit to allow it to supply underspeed relay 6 with a sufficient voltage to maintain it energized. This action can only occur if transistor Q12 is turned off by conduction in transistor Q11. Thus it is apparent that intermittent operation of transistors Q11 and Q12 is necessary to maintain underspeed relay 6 energized.

When transistor Q12 is turned off, by the conduction of transistor Q11, it supplies a sufficient bias to transistor Q9 to cause it to conduct. Transistor Q9 controls operation of switch 9 in that only when transistor Q9 is conducting can transistors Q7 and Q8 conduct. Before discussing the effect of transistor Q9, we will first discuss the speed select network 11-2 and the check oscillator 10.

Speed select network 11-2 is operated commensuratley with speed select network 11-1. As has been noted before, the check oscillator frequency is set at a value slightly above the cut-off frequency of filter unit 14. Thus, for a speed limit of 35 miles per hour, the cut-off frequency of filter 14 is selected to be equal to the frequency produced by the axle generator at a speed of 35 miles per hour. In this manner, the resistor in speed select 11-1 associated with the 35 mile per hour speed limit can be selected. The check oscillator, for a similar speed limit, is set to a frequency slightly above the cut-off frequency corresponding to 35 miles per hour. In a preferred embodiment the check oscillator frequency is 2% above the cut-off frequency of filter 14. In this manner, the resistor associated with that particular speed limit in speed select network 11-2 can be selected. The check oscillator 10 is a relaxation voltage controlled oscillator whose RC time constant is varied by varying the resistor in accordance with the selected speed limit. Therefore, for any particular speed limit, one of the switches 2-1 through 2-5 is selected to place one the resistors 71 through 75 in the check oscillator circuit 10.

The output of the check oscillator is provided to the base of transistor Q7 of the mono-stable multivibrator Q7-Q8. Since the emitters of transistors Q7 and Q8 are not tied to ground, but instead are tied to the collector of switching transistor Q9, only when Q9 is conducting can the multivibrator Q7-Q8 operate. And, as has been explained with reference to the relay driver 17, Q9 is only conducting when transistor Q12 is cut off by reason of the conduction of Q11. The voltage output from switch 9 is taken from the collector of transistor Q7 and coupled through capacitor 24, resistor 23, and resistor 25 to the base of transistor Q1 in the amplifier 13. As a result, although check oscillator 10 is free running, only when switch 9 is closed, that is, when transistor Q9 is conducting will the pulse from the check oscillator be coupled through to the amplifier 13.

One of the essential requirements of the apparatus is that the signals provided by the check oscillator and the signals provided by the axle generator should not mix, that is, they should not produce a signal at a frequency other than the check oscillator or the speed signal. Were this to occur, it would vitiate the checking features of the apparatus.

In normal operation, when a speed limit has been selected, one of the switches 1-1 through 1-5 will be closed to select one of the resistors 61 through 65, and a corresponding switch in the group 2-1 through 2-5 would be closed to select a corresponding resistor 71 through 75. This determines the cut-off frequency of the filter 14 and also the frequency of the check oscillator 10. We will assume at the outset that relay driver 17 has transistor Q11 cut off and transistor Q12 conducting. This will result in transistor Q9 being cut off so as to interrupt check oscillator signals from reaching the amplifier 13. As a result, the speed signals are coupled through terminals 3 and 4 to the amplifier 13. At a zero crossing of the speed signal a positive pulse is coupled through capacitor 27 to the filter unit 14. Each of these pulses will cause mono-stable multivibrator Q2-Q3 to produce an output pulse which, during its existence, will cause transistor Q4 to conduct. The period of the output pulse is predetermined by the RC time constant of the mono-stable multivibrator and in a preferred embodiment, 18 microseconds have been selected. Assuming that the vehicle is under speed, the repetition rate of the output signals produced by the multivibrator Q2-Q3 will be at a rate insufficient to cause capacitor 40 to charge sufficiently to cause complementary unijunction transistor Q5 to conduct. Therefore, no ouput pulses will be provided to the squaring circuit 15. This will result in integrator 16 not producing an output signal and, by reason of the PNP transistor connection Q10, a voltage will be produced across resistor 78 to cause transistor Q11 to conduct. This will cause capacitor 80 to charge and block transistor Q12. As a result, capacitor 83 will be discharged through the underspeed relay 6, maintaining it energized. However, at the same time as transistor Q12 is turned off, transistor Q9 is turned on allowing check oscillator signals to reach the input of amplifier 13. At this time, the frequency of input signals provided amplifier 13 is that of check oscillator 10 which has been adjusted to be slightly above the cut-off frequency of filter 14. Therefore, the pulses produced by mono-stable multivibrator Q2-Q3 will be at a sufficiently great repetition rate so that complementary unijunction transistor Q5 will be caused to conduct. These output pulses produced by the conduction of unijunction transistor Q5 will be provided to squaring circuit 15 and integrator 16. This will result in cutting off of transistor Q10 to thereby turn off transistor Q11. As a result, a now charged capacitor 80 will provide a supply voltage for underspeed relay 6 to maintain it energized. Cutting off transistor Q11 will turn on transistor Q12 to allow capacitor 83 to charge. This will also turn off transistor Q9 to cease transmitting check oscillator pulses to the amplifier 13.

In this manner the relay driver 17 alternates the capacitors 80 and 83 to intermittently provide energy for underspeed relay 6 to maintain it energized.

It is thus apparent that the speed of the vehicle, translated into a frequency of pulses, is compared with the cut-off frequency of filter unit 14. As a result, the cut-off frequency of filter 14 is a standard against which the determination of underspeed or overspeed is made. It if therefore necessary that this cut-off frequency be maintained in order that the system detect, reliably, overspeed conditions. Variations in resistor value, variations in other resistances in the circuit, such as contact resistance, variations in the period of the mono-stable multivibrator Q2–Q3, can all cause an effective change in the cut-off frequency of filter 14. For that reason, the check oscillator signals, which are designed to be above the cut-off off frequency of filter 14, are provided to check that the cut-off frequency of filter 14 does not rise.

From the preceding discussion, it will be apparent that if the check oscillator signal is mixed with the speed signals and produce signals at a frequency greater than the check oscillator frequency, the checking function will not properly be performed. In that event, the higher than check oscillator frequency signal would still pass the filter unit notwithstanding the fact that the cut-off frequency may have been raised. Thus, the system would exhibit normal operation when in fact a malfunction should be detected.

For the foregoing reason it is important that the check oscillator signals and the speed signals do not mix. This requirement can be translated into a requirement that when the check oscillator produces a low voltage that the amplifier 13 not respond to the changing values of the speed signal. This is assured since the impedance between capacitor 24 and ground, when transistors Q7 and Q9 are conducting, is essentially that of two saturated transistors which is very low. On the other hand, when a 12 volt signal is produced by the check oscillator, the amplifier 13 should not respond to low voltages or zero voltages produced by the axle generator. This is assured by the biasing arrangement of transistor Q1 which has its base tied to the +A supply through resistors 21 and 25.

During the period of time when transistor Q9 is non-conducting, the input to capacitor 24 is a constant voltage of value approximately equal to +A. Under these circumstances transistor Q1 and amplifier 13 can follow the variations in the axle generator input by reason of capacitor 24 blocking this voltage from affecting the operation of the circuit.

Furthermore, it will be apparent that by reason of the fact that check oscillator 10 is free running, the problems that would be associated with the change in frequency of an oscillator as it is turned on are thereby avoided. That is, it is the cut-off frequency of filter 14 which is the standard against which an underspeed or overspeed condition is measured. However, it is the check oscillator frequency which is the standard by which the cut-off frequency of filter 14 is checked. Thus, the check oscillator 10 should be stable in frequency and this is achieved by allowing the oscillator to be free running.

What we claim is:

1. Speed sensing apparatus for sensing speed in excess of a selectable predetermined speed comprising, signal source means producing signals at a frequency proportional to vehicle speed, signal combining means connected to said signal source means, a high-pass filter connected to said signal combining means, said filter having a cut-off frequency selectable and proportional to said predetermined speed, bistable output means, connected to the output of said filter, and operated to one state in response to a signal from said filter, and operated to said other state in response to the absence of a signal from said filter, a check oscillator tuned to a selectable frequency slightly higher than said cut-off frequency of said filter, switch means controlled by said bistable output means to pass signals from check oscillator when said bistable output means is in said one state, said switch means connected between said check oscillator and said signal combining means said signal combining means suppressing signals from said signal source means when said check oscillator signals are applied to said signal combining means by said switch means.

2. The apparatus of claim 1 which further includes indication means connected to said bistable output means, said indication means being operated to one state in response to said bistable output means continually switching from its said one state to its said other state and operable to a second position in response to an absence of switching in said bistable output means.

3. The apparatus of claim 1 in which said check oscillator is free running.

4. The apparatus of claim 1 in which said filter includes a capacitor which is discharged at a rate proportional to the frequency of signals from said signal source and which is charged at a rate proportional to said predetermined speed, said filter further including voltage sensing means the output of which is connected to said bistable output means to produce an output signal when the voltage on said capacitor drops below a predetermined voltage.

5. The apparatus of claim 4 in which said filter includes a monostable multivibrator connected to the output of said signal combining means, and second switch means connected to said capacitor and controlled by said monostable multivibrator to discharge said capacitor.

6. The apparatus of claim 5 in which said capacitor is connected for charging to a selectable one of a plurality of resistors, said resistors being chosen in relation to said predetermined speed.

7. A method of checking a speed sensing apparatus in which signals at a frequency proportional to speed are provided to a filter whose cut-off frequency is proportional to a speed limit and in which an underspeed condition is indicated so long as the frequency of signals from said source do not exceed the cut-off frequency of said filter comprising the steps of, sensing the absence of signals from said filter, energizing an oscillator whose frequency is selectable to a frequency slightly higher than said cut-off frequency, masking the signals from said signal source by the signals from said check oscillator, and sensing that check oscillator signals pass said filter.

8. Apparatus for determining whether or not a vehicle is exceeding a predetermined speed limit comprising a source for producing speed signals at a frequency proportional to vehicle speed, high pass filter means with a cut-off frequency selectable in relation to said predetermined speed limit and a detector responsive to the output of said high pass filter means, wherein the improvement comprises, a check oscillator producing check signals at a selectable frequency slightly in excess of said cut-off frequency, first means providing a path for said speed signals and check signals to said high pass filter means to suppress said speed signals when said check signals are present, bistable means operated by said detector to one state when signals pass said high pass filter means and to another state when signals do not pass said high pass filter means, and switch means operated by said bistable means when in said another state to provide check signals to said first means, whereby alternate operation of said bistable means indicates an underspeed condition.

9. The apparatus of claim 8 wherein said check oscillator is free-running.

10. The apparatus of claim 8 wherein said high pass filter means comprises an electronic filter.

11. The apparatus of claim 8 wherein said high pass filter means includes a capacitor charged at a rate equal to the frequency of signals applied to said high pass filter means.

12. The apparatus of claim 11 wherein said cut-off frequency is selectable by varying a resistance through which said capacitor is connected.

* * * * *